US008636374B2

(12) United States Patent
Yu et al.

(10) Patent No.: US 8,636,374 B2
(45) Date of Patent: Jan. 28, 2014

(54) BACKLIGHT UNIT AND DISPLAY DEVICE INCLUDING THE SAME

(75) Inventors: Dong Kug Yu, Seoul (KR); Sung Yong Park, Seoul (KR); Young Bae Jang, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 305 days.

(21) Appl. No.: 13/158,004

(22) Filed: Jun. 10, 2011

(65) Prior Publication Data

US 2011/0305039 A1 Dec. 15, 2011

(30) Foreign Application Priority Data

Jun. 11, 2010 (KR) .......................... 10-2010-0055302

(51) Int. Cl.
*F21V 7/04* (2006.01)
*G09F 13/04* (2006.01)
(52) U.S. Cl.
USPC ........................... 362/97.3; 362/373; 362/294
(58) Field of Classification Search
USPC ............... 362/97.1–97.4, 294, 373, 632, 633, 362/634, 218, 345, 547, 126, 580
See application file for complete search history.

(56) References Cited

U.S. PATENT DOCUMENTS

| 7,438,450 B2* | 10/2008 | Aoki et al. ..................... 362/373 |
| 7,452,109 B2* | 11/2008 | Noh et al. ..................... 362/294 |
| 7,452,121 B2* | 11/2008 | Cho et al. ..................... 362/633 |
| 7,651,249 B2* | 1/2010 | Ohashi et al. ................. 362/373 |
| 2007/0153548 A1 | 7/2007 | Hamada et al. |

FOREIGN PATENT DOCUMENTS

| CN | 201017144 Y | 2/2008 |
| JP | 2008-251245 A | 10/2008 |
| KR | 10-2006-0084559 A | 7/2006 |
| KR | 10-2006-0131382 A | 12/2006 |
| KR | 10-2007-0020823 A | 2/2007 |
| KR | 10-2007-0076879 A | 7/2007 |
| TW | 200600927 A | 1/2006 |

* cited by examiner

*Primary Examiner* — Bao Q Truong
(74) *Attorney, Agent, or Firm* — Birch, Stewart, Kolasch & Birch, LLP

(57) ABSTRACT

A backlight unit capable of emitting heat smoothly and a display device including the same are disclosed. The backlight unit includes a bottom cover; a light emitting module arranged in the bottom cover; a first heat sink arranged to an outside of the bottom cover; and a second heat sink arranged in the bottom cover, the second heat sink located between the light emitting module and the first heat sink.

20 Claims, 12 Drawing Sheets

BACKLIGHT UNIT AND DISPLAY DEVICE INCLUDING THE SAME

CROSS REFERENCE TO RELATED APPLICATION

This application claims the benefit of the Patent Korean Application No. 10-2010-0055302, filed on Jun. 11, 2010, which is hereby incorporated by reference as if fully set forth herein.

BACKGROUND OF THE DISCLOSURE

1. Field of the Disclosure

This embodiment relates to a backlight unit and a display device including the same, more particularly, to a backlight unit capable of radiating heat smoothly and efficiently, and a display device including the backlight unit.

2. Discussion of the Related Art

Among display devices, a liquid crystal display device requires a backlight unit providing lights to display images.

Such a backlight unit includes a bottom cover, a light source provided on the bottom cover to generate a light, a life guide plate disposed on a front surface of the bottom cover, adjacent to the light source, and an optical sheet attached to the light guide plate to diffuse or refract the light emitted from the light guide plate.

A display device includes a display panel arranged on a passage of the light emitted from the backlight unit.

SUMMARY OF THE DISCLOSURE

Accordingly, this embodiment is directed to a backlight unit and a display device including the same.

An object of this embodiment is to provide a backlight unit capable of emitting heat generated from a light emitting module outside smoothly, and a display device including the backlight unit.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings. To achieve these objects and other advantages and in accordance with the purpose of the invention, as embodied and broadly described herein, a backlight unit includes a bottom cover; a light emitting module arranged in a predetermined area of the bottom cover; a first heat sink arranged in one side of the bottom cover; and a second heat sink arranged in the other side of the bottom cover, the second heat sink located between the light emitting module and the first heat sink.

Here, the second heat sink may include a first heat radiating part provided to contact with the first heat sink, and a second heat radiating part provided to contact the light emitting module.

The light emitting module may be arranged in a side portion of the bottom cover, and the second heat radiating part of the second heat sink may be arranged in a lower portion of the light emitting module, and the first heat radiating part of the second heat sink is bent from the second heat radiating part, to surface-contact with the first heat sink.

The backlight unit may further include a recess provided in the lower portion of the bottom cover so that the first heat radiating part of the second heat sink is coupled to the first heat sink located in one side of the bottom cover.

Here, the recess may be arranged, corresponding to the second heat sink.

The width of the recess may be identical to the width of the second heat sink.

The first heat sink may be arranged from a rear surface of the bottom cover in a predetermined direction, and an end of the first heat sink is extended to surface-contact with the first heat radiating part of the second heat sink via an end of a rear surface of the bottom cover.

The plurality of the first heat sinks may be arranged in a rear surface of the bottom cover, spaced apart a predetermined distance from each other.

In another aspect of this embodiment, a backlight unit includes a bottom cover; a light emitting module provided in the bottom cover, the light emitting module comprising a module substrate and a light emitting element formed on an upper surface of the module substrate; a first heat sink arranged in one side of the bottom cover; a second heat sink arranged in the other of the bottom cover, the second heat sink comprising a first heat radiating part contacting a side surface of the module substrate and an upper surface of the first heat sink and a second heat radiating part contacting a lower surface of the module substrate.

Here, the side surface of the module substrate and the first heat radiating part may be adhered by a first adhesive material, and the lower surface of the module substrate and the second heat radiating part may be adhered by a second adhesive material.

The first heat radiating part of the second heat sink may be arranged in parallel to an upper surface of the first heat sink and the second heat radiating part of the second heat sink may be arranged perpendicular to the upper surface of the first heat sink.

A reflective sheet may be arranged on an upper surface of the first heat sink and the first heat sink may be arranged on a lower surface of the first heat radiating part.

The first heat radiating part may include a first end and a second end opposed to each other, and the first end of the first heat radiating part may contact with an end of the bottom cover and the second end of the first heat radiating part may contact with an end of the second heat radiating part.

In a further aspect of this embodiment, a display device includes a bottom cover; a light emitting module arranged in a predetermined area of the bottom cover; a first heat sink arranged in one side of the bottom cover; a second heat sink arranged in the other side of the bottom cover, the second heat sink located between the light emitting module and the first heat sink; a light guide plate arranged in a light emitting direction of the light emitting module; an optical sheet arranged on the light guide plate; and a display panel arranged on the optical sheet.

It is to be understood that both the foregoing general description and the following detailed description of this embodiment are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings.

DESCRIPTION OF SPECIFIC EMBODIMENTS

Reference will now be made in detail to this embodiment, examples of which are illustrated in the accompanying drawings. Wherever possible, the same reference numbers will be used throughout the drawings to refer to the same or like parts.

As follows, an exemplary embodiment will be described in reference to the accompanying drawings.

Figure 1:
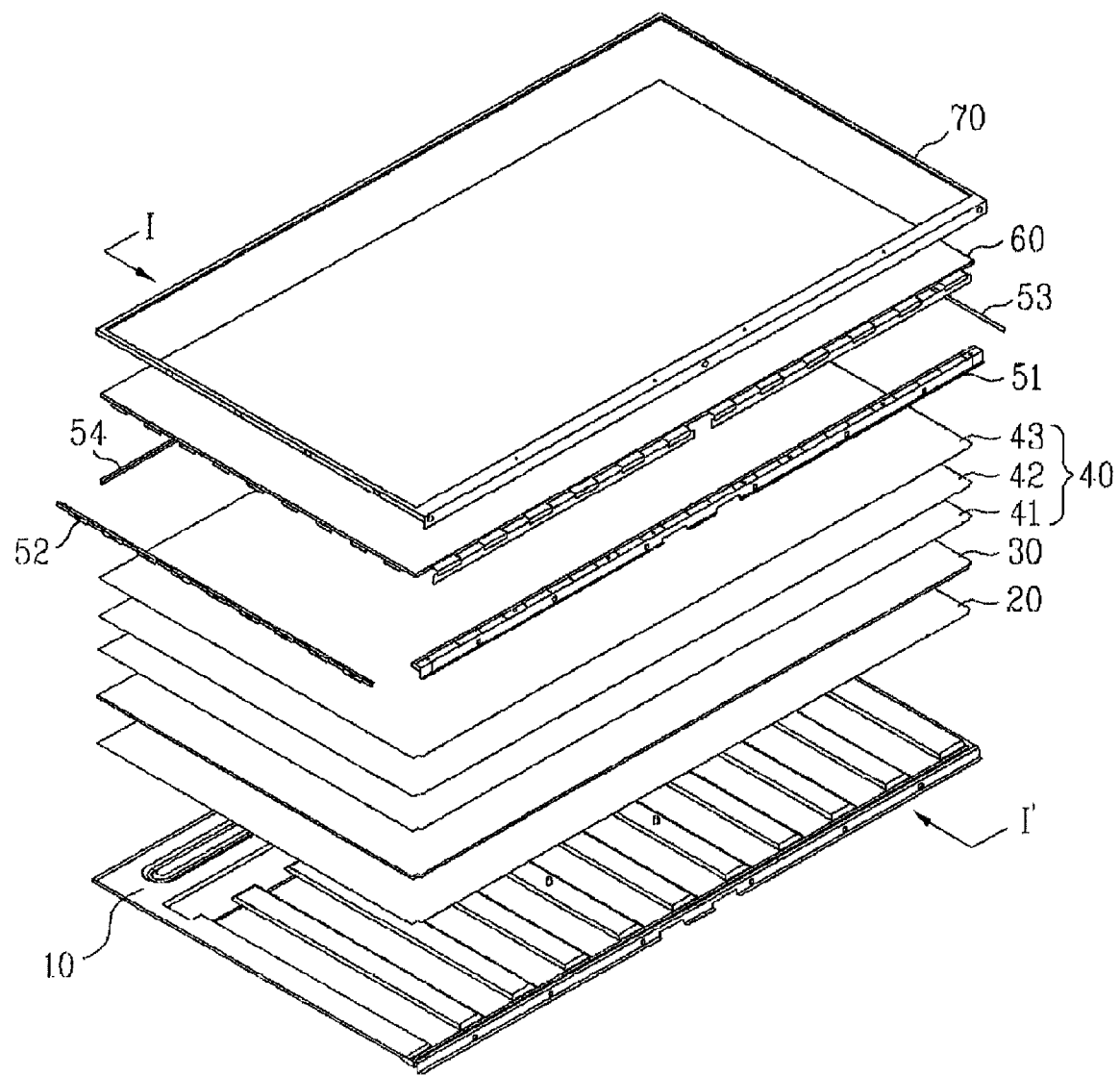
FIG. 1 is an exploded perspective view illustrating a display device according to this embodiment.

As shown in FIG. 1, a display device according to the exemplary embodiment includes a bottom cover 10, a light emitting module (not shown) provided in a predetermined portion inside the bottom cover, a reflective sheet 20 arranged on a front surface of the bottom cover 10, a light guide plate 30 arranged in front of the reflective sheet 20 to guide a light emitted from the light emitting module toward a front of the display device, an optical sheet 40 arranged in front of the light guide plate 30, a liquid crystal display 60 arranged in front of the optical sheet 40, a top cover 70 provided in front of the liquid crystal display panel, and a fixing member including a first fixing member 51, a second fixing member 52, a third fixing member 53 and a fourth fixing member 54 arranged between the bottom cover 10 and the top cover 70 to fix the bottom cover 10 and the top cover 70 to each other.

The light guide plate 30 is employed to guide a light emitted from the light emitting module (not shown) to be a surface light source and the reflective sheet arranged in rear of the light guide plate 30 reflects the light emitted from the light emitting module (not shown) toward the light guide plate 30, to control light efficiency.

Here, the reflective sheet 20 can be provided as auxiliary component as shown in this drawing or it can be material having high reflectance which will be coated on a rear surface of the light guide plate 30 or a front surface of the bottom cover 10.

The optical sheet 40 arranged on the front surface of the light guide plate 30 diffuses and refracts the light emitted from the light guide plate 30. Because of that, luminance and light efficiency may be controlled.

The optical sheet 40 may include a plurality of elements or a single element.

In other words, the optical sheet 40 may include a first diffusive sheet 41, a prism sheet 42, a second diffusive sheet 43, or it may be an optical sheet having a diffusive sheet function and a prism sheet function.

The number and kinds of the optical sheets 40 may be selective according to required luminance characteristics.

Figure 2:
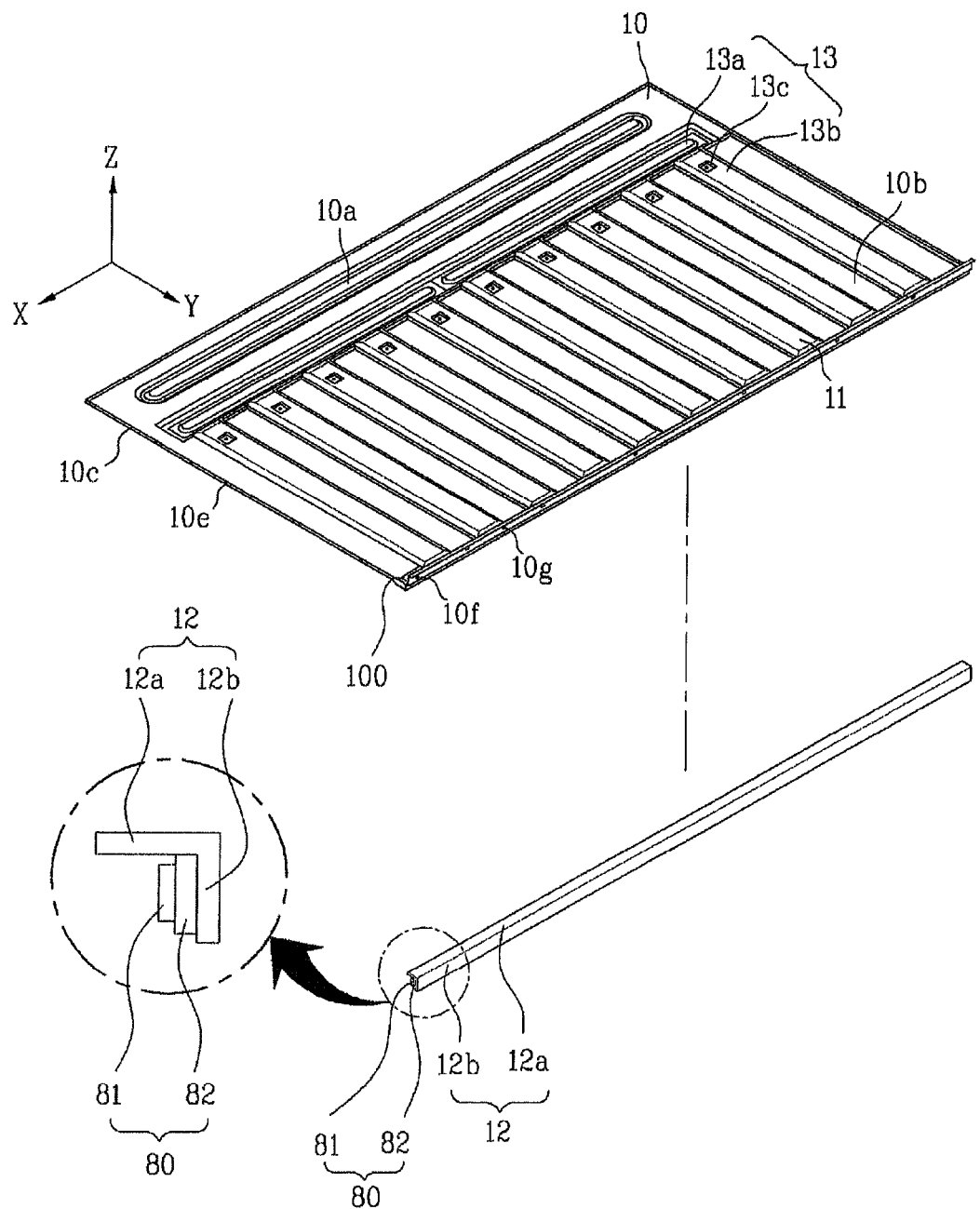
FIG. 2 is a rear perspective view illustrating a light emitting module and a bottom cover provided in a backlight unit of the display device according to this embodiment.
Figure 3:
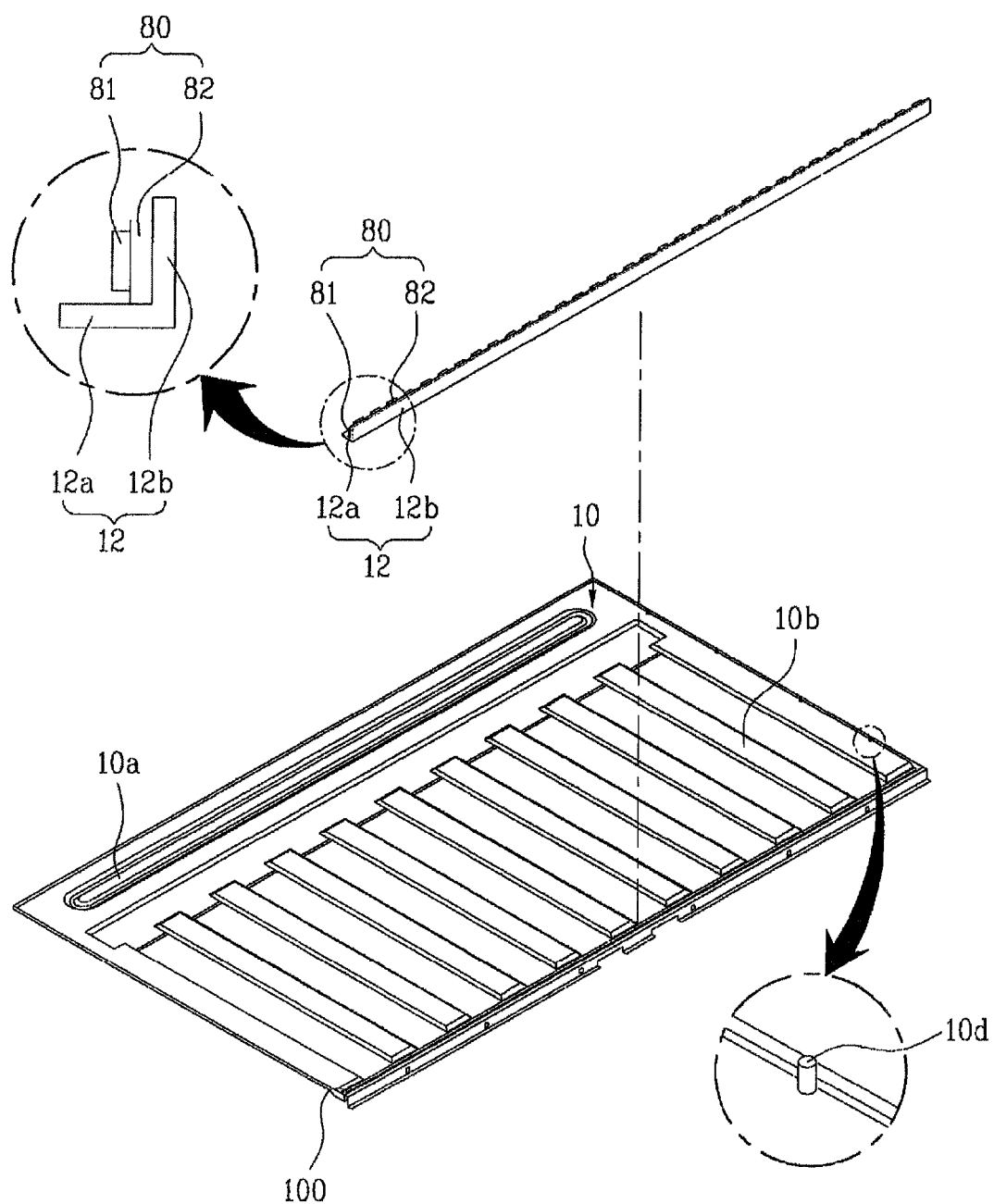
FIG. 3 is a front perspective view illustrating a light emitting module and a bottom cover provided in a backlight unit of the display device according to this embodiment.

FIGS. 2 and 3 are a rear and a front perspective views of the bottom cover 10 according to the above embodiment.

The bottom cover 10 can be fabricated of a metal plate type. To reinforce rigidity thereof, the bottom cover may include a first forming part 10a extended along a direction of X-axis, and a second forming part 10b extended along a direction of Y-axis. Here, the first forming part 10a and the second forming part 10b are formed convex in a direction of Z-axis.

The bottom cover 10 is pressed to form the first forming part 10a and the second forming part 10b. The first and second forming parts 10a and 10b are provided to reinforce rigidity of the bottom cover 10.

A plurality of first heat sinks 11 configured of heat pipes or heat sinks are installed between two of the second forming parts 10b. The first heat sinks 11 are spaced apart a predetermined distance from each other.

The first heat sink 11 receives heat generated by the light emitting operation of the light emitting module (not shown) arranged in the bottom cover 10 and it radiates the heat outside.

For that, the first heat sinks 11 may be arranged in the direction of Y-axis between the second forming parts 10b, with a predetermined length.

An edge wall 10c bent forwardly from an edge of the bottom cover 10 is provided to prevent the light guide plate, the optical sheet or the reflective sheet, installed within the bottom cover 10, from separating to the outside.

The light emitting module 80 is arranged in the bottom cover 10 and the second heat sink 12 which will contact with the first heat sinks 11 is provided at the outside of the bottom cover 10.

The second heat sink 12 is formed of a 'L' shaped bracket and it includes a first heat radiating part 12a surface-contacting the first heat sinks 11 and a second heat radiating part 12b surface-contacting the light emitting module 80.

The second heat radiating part 12b and the first heat radiating part 12a are bent from each other, and it is preferable that the first and second heat radiating parts 12a and 12b are integrally formed.

The light emitting module 80 includes a module substrate 82 and a light emitting element 81 arranged on the module substrate 82. The light emitting element 81 may be configured of an LED and this embodiment is not limited thereto.

The second heat sink 12 may be arranged to a recess 100 of the bottom cover 10. By the recess 100, the first heat sinks 11 provided in the outside of the bottom cover 10 may be coupled to the second heat sink 12 provided in the inside of the bottom cover 10.

If the second heat sink 12 is insertedly arranged to the recess 100, the first heat radiating part 12a of the second heat sink 12 may contact with the first heat sink 11.

The width of the recess 100 may be longitudinal in a right and left direction, corresponding to the width of the second heat sink 12, to allow the second heat sink 12 arranged to the recess 100 smoothly.

Coupling holes 10f and 10g may be provided in an end portion of the bottom cover 10 so that the fixing member (51-54, see FIG. 1) and the top cover (70, see FIG. 1) are coupled to the bottom cover 10 by coupling members such screws.

A coupling protrusion 10e may be provided in the edge wall 10c of the bottom cover 10 so that the top cover (70, see FIG. 1) is coupled to the edge wall 10c of the bottom cover 10.

An H-beam may be installed in an outside surface of the bottom cover 10 to supplement the rigidity of the bottom cover 10.

An installation member 13 is provided in the bottom cover 10 to fix the first heat sinks 11 to the bottom cover 10.

The installation member 13 includes a body portion 13a arranged along the direction of X-axis, an extended portion 13b extended toward the first heat sinks 11 perpendicularly from the body portion 13a, in the direction of Y-axis, and a coupling hole 13c formed in the extended portion 13b so as to couple the first heat sinks 11 to the bottom cover 10.

As a result, after the first heat sinks 11 are placed on the outside surface of the bottom cover 10, the extended portion 13b of the installation member 13 is placed on rear surfaces of the first heat sinks 11 and the coupling member is then inserted in the coupling hole 13c provided in the extended portion 13b. After that, the first heat sinks 11 are fixedly arranged between the bottom cover 10 and the extended portion 13b in close contact by the securing force of the coupling member.

As shown in FIG. 3, an inside surface of the bottom cover 10 may be formed a predetermined space where the reflective sheet (20, see FIG. 1), the light guide plate (30, see FIG. 1) and the optical sheet (40, see FIG. 1) and the like described above are arranged.

A supporting part 10d is formed in each of both sides of the front surface of the bottom cover 10 to support recesses (not shown) formed in the light guide plate (30, see FIG. 1) and the optical sheet (40, see FIG. 1).

The supporting part 10d may be configured of a protrusion or a cylindrical boss, to have a structure enabling the above components to be there over smoothly.

According to the securing relation between the recess 100 and the second heat sink 12 insertedly arranged to the recess 100, the first heat radiating part 12a of the second heat sink 12 is inserted in the recess 100 and the second heat radiating part 12b is arranged to the inside surface of the bottom cover 10.

If such the arrangement is completed, the light emitting element 81 of the light emitting module 80 is toward an inner space of the bottom cover 10.

Figure 4:
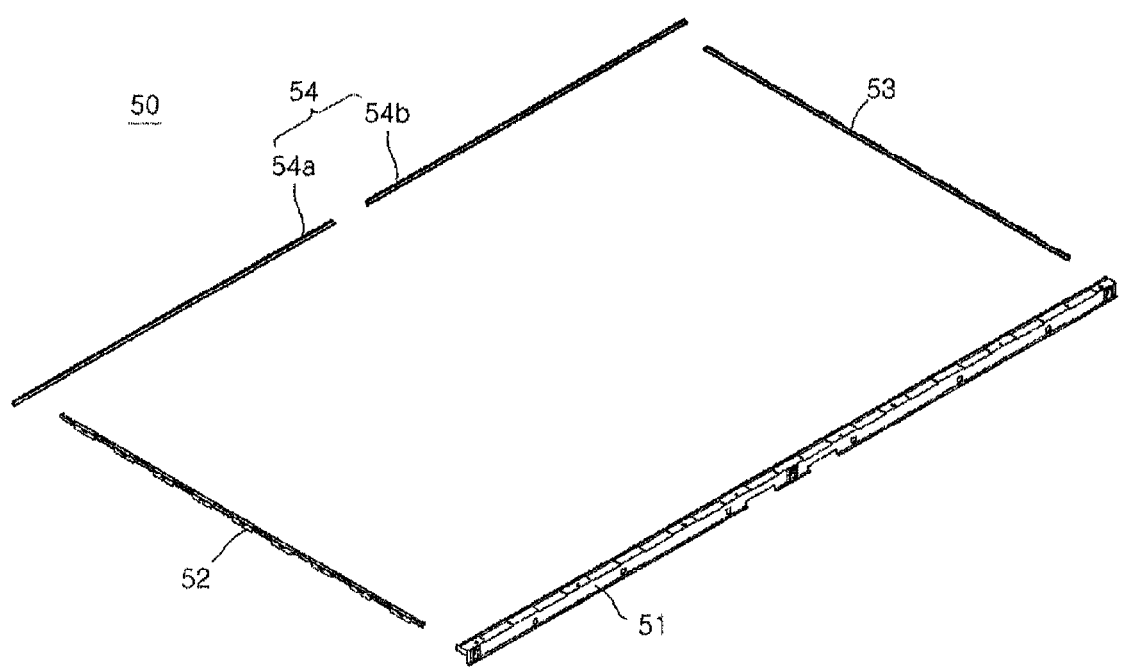
FIG. 4 is a perspective view illustrating a supporting member provided in the backlight unit of the display device according to this embodiment.

As shown in FIG. 4, the fixing member 50 has a following configuration. The fixing member 50 includes a first fixing member 51, a second fixing member 52, a third fixing member 53 and a fourth fixing member 54.

The fourth fixing member 54 may be separated into two and these two separated fourth fixing members are referenced to as numeral references 54a and 54b.

Here, the first fixing member 51 and the fourth fixing members 54 are opposite to each other, and may be installed in the end portion of the bottom cover (10, see FIG. 2).

The third fixing member 53 and the second fixing member 52 are opposite to each other, and may be arranged in the end portion of the bottom cover 10, respectively.

In an aspect of material, the first fixing member 51 may be formed of synthetic resin and the other second, third and fourth fixing members 52, 53 and 54 may be formed of metal material.

Figure 5:
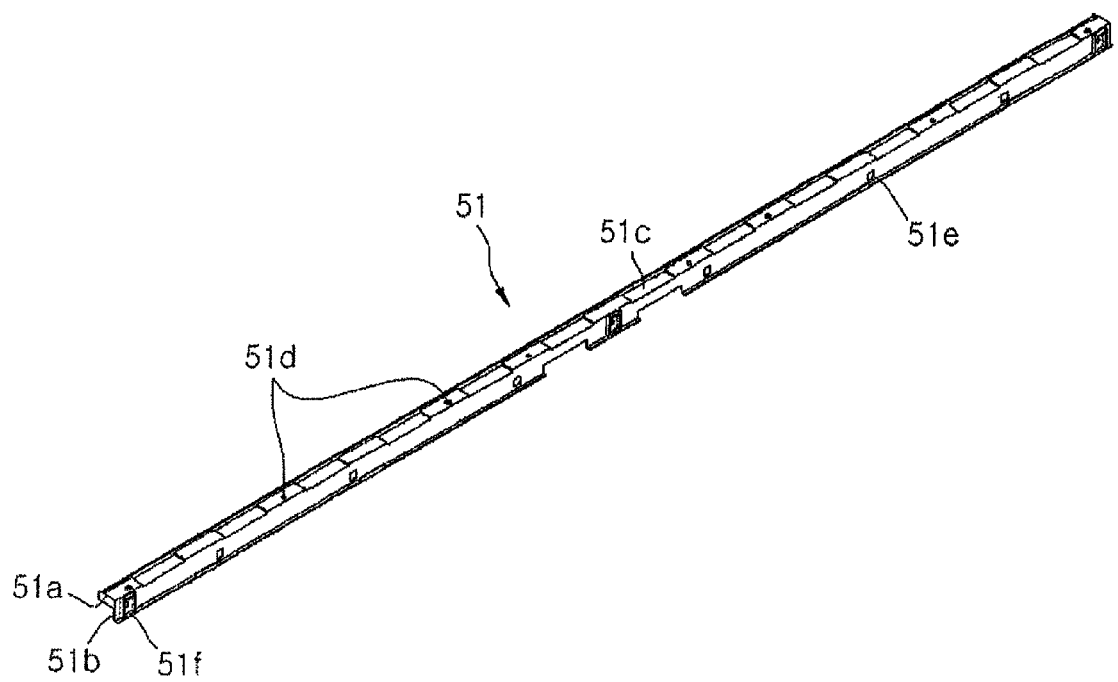
FIGS. 5 and 6 are perspective views illustrating a first supporting member provided in the backlight unit of the display device according to this embodiment.
Figure 6:
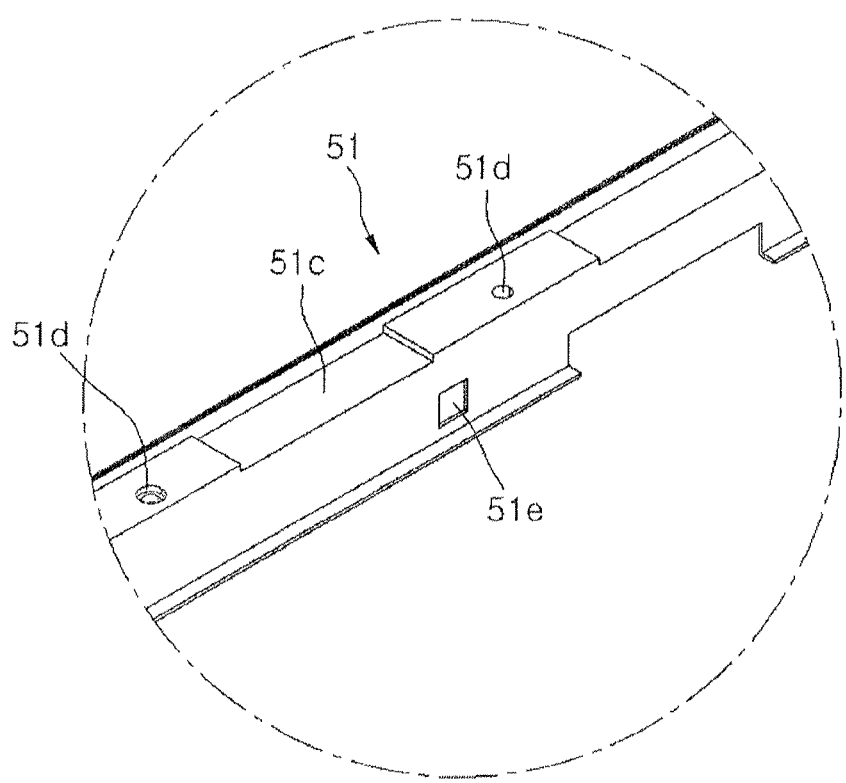

As shown in FIGS. 5 and 6, the first fixing member 51 includes a first portion 51a arranged on the bottom cover (10, see FIG. 1), the light emitting module (not shown) and the optical sheet (40, see FIG. 1) and a second portion 51b perpendicularly bent from the first portion 51a to be arranged in the bottom cover (10, see FIG. 1).

Figure 7:
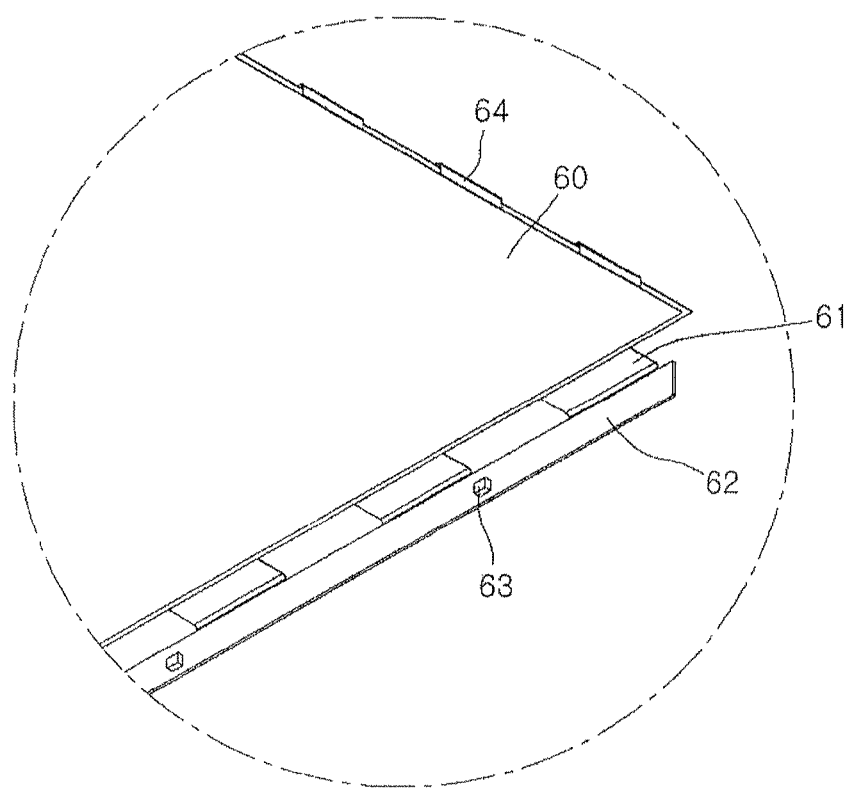
FIG. 7 is a perspective view illustrating a display panel provided in the display device according to this embodiment.

A recessed path 51c is formed in the first portion 51a and as shown in FIG. 7, the flexible printed circuit board 61 provided below the display panel (60, see FIG. 1) is arranged in the recessed path 51c to be extended outward from the bottom cover (10, see FIG. 1).

A first coupling hole 51d is formed next to the recessed path 51c to insert a coupling member such as a screw therein to couple the bottom cover (10, see FIG. 1) or the top cover (70, see FIG. 1) to each other.

As shown in FIG. 7, a chip arranging hole 51e is formed in the second portion 51b to arrange a chip 63 arranged to the PCB 62 of the display panel 60 therein. In addition, a coupling hole 51d is formed in the first portion 51a to insert a coupling member such as a screw therein to couple the bottom cover 10 and the top cover (70, see FIG. 1) to each other.

Figure 8:
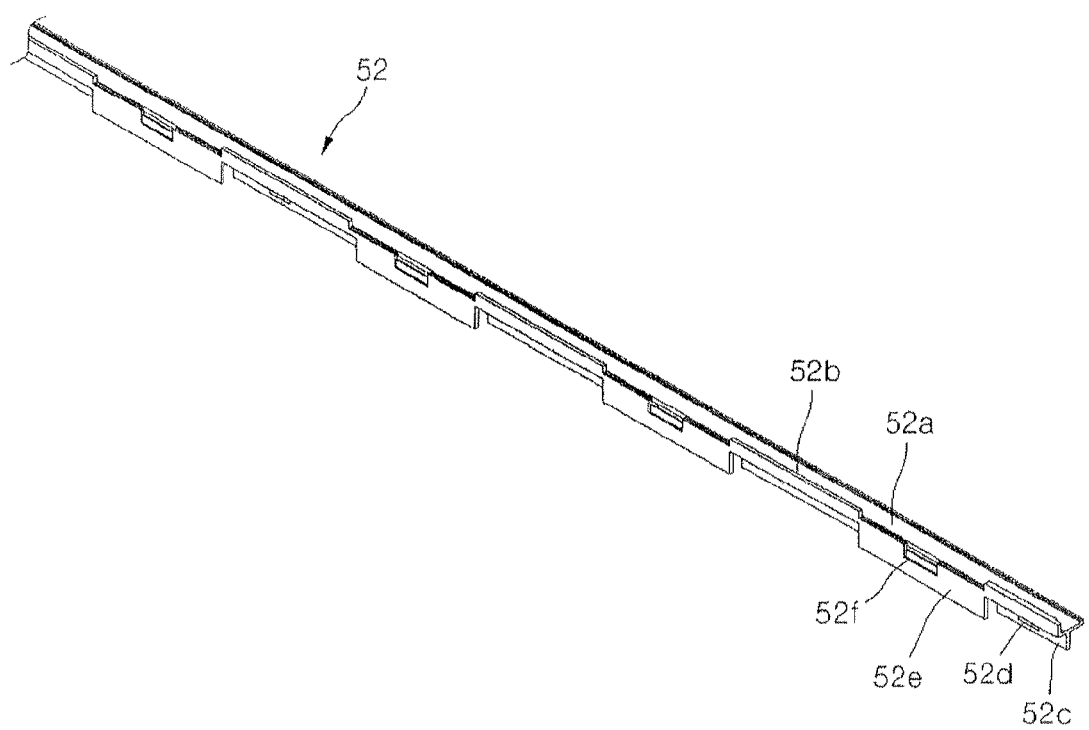
FIG. 8 is a perspective view illustrating a second supporting member provided in the backlight unit of the display device according to this embodiment.

As shown in FIG. 8, the second fixing member 52 is employed to support the reflective sheet (20, see FIG. 1), the light guide plate (30, see FIG. 1) and the optical sheet (40, see FIG. 1) to contact with the bottom cover (10, see FIG. 1) airtight.

Such the second fixing member 52 includes a first portion 52a supporting the display panel (60, see FIG. 1), a second portion 52b projected upward from the first portion 52a to prevent movement of the display panel 60, and third and fourth portions 52c and 52e projected downward from the first portion 52a, spaced apart a predetermined distance from each other alternatively, to be arranged inner and outer with respect to a side wall of the bottom cover 10, respectively.

The second portion 52b is projected upwardly from an outer edge of the first portion 52a and the fourth portion 52e is projected downward from an outer edge of the first portion 52a, located in a predetermined area of the second portion 52b.

The third portion 52c is extended downwardly from a center surface of the first portion 52a.

The second fixing member 52 may be forcedly inserted in the side wall of the bottom cover (10, see FIG. 1) by the third portion 52c and the fourth portion 52e.

In addition, a securing protrusion 52d is formed in the third portion 52c and the securing protrusion 52d is inserted in a corresponding hole formed in the bottom cover (10, see FIG. 1) to be connectedly hooked.

A chip arranging recess 52f is formed in the fourth portion 52e and the chip arranging recess 52f provides a predetermined space in which a chip (not shown) installed on a flexible PCB 61 provided in the display panel 60 can be arranged, as shown in FIG. 7.

A dielectric tape or a dielectric coated layer may be formed in a predetermined area of the first portion 52a in contact with the flexible PCB 61.

The third fixing member 53 may be formed in the same structure as the second fixing member 52 and repeated description of the third fixing member 53 will be omitted accordingly.

The fourth fixing member 54 may be formed in the same or similar structure as the second and third fixing members 52 and 53 and repeated description of the fourth fixing member 54 will be omitted accordingly.

The fourth fixing member 54 is arranged in an upper portion of the bottom cover (10, see FIG. 1). Because of that, the fourth fixing member 54 does not have to be long.

In this case, the fourth fixing member 54 might be curved or damaged. The fourth fixing member 54 may be divided into two portions like 54a and 54b shown in FIG. 4. As a result, the fourth fixing member 54 may be arranged to the bottom cover 10 more stably.

In contrast, the first fixing member 51 is formed with a relatively large area, compared with the fourth fixing member 54, and it is less likely to be curved or damaged. If it is formed of synthetic resin, the first fixing member 51 is more stable and it does not have to be divided into two portions.

Figure 9:
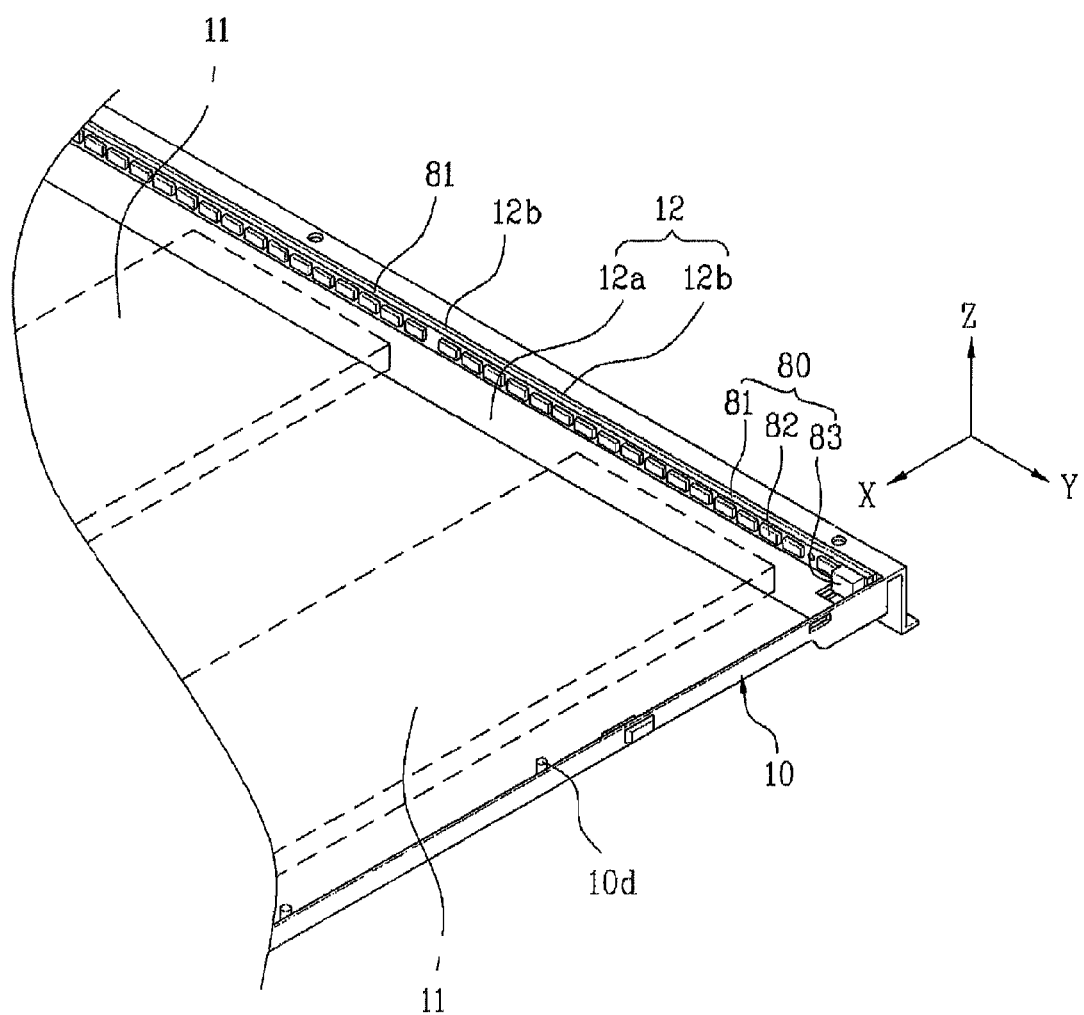
FIG. 9 is a diagram illustrating a light emitting module installed in an inner portion of the bottom cover provided in the backlight unit of the display device according to this embodiment.

As shown in FIG. 9, the first heat sinks 11 are arranged on the rear surface of the bottom cover 10, spaced apart a predetermined distance from each other. Adjacent to an end of the first heat sinks 11, the second heat sink 12 is arranged.

The first heat sinks 11 may be arranged in a predetermined first direction of the bottom cover 10, preferably, an X-axis direction. The second heat sinks 12 may be arranged in a second direction of the bottom cover 10, preferably, a Y-axis direction.

Here, the Y-axis direction is orthogonal to the X-axis direction.

A lower surface of the second heat sink 12 is able to surface-contact with an upper surface of the first heat sink 11. Because of that, heat transmission may be possible between the first and second heat sinks 11 and 12.

The second heat sink 12 includes a first heat radiating part 12a in surface-contact with the first heat sinks 11 and a second heat radiating part 12b having the light emitting module 80 arranged thereon, perpendicular to the first heat radiating part 12a.

The light emitting module 80 is arranged on a predetermined surface of the second heat radiating part 12b possessed by the second heat sink 12. According to the configuration of the light emitting module 80, a module substrate 81 is arranged along the second heat radiating part 12b longitudinally and a plurality of light emitting elements arranged on the module substrate 81, spaced apart a predetermined distance from each other, and a connector 83 connects the module substrate 81 with an external power device or the PCB.

FIG. 9 illustrates the light emitting element 82 configured of LED and this embodiment is not limited thereto. The light emitting element 82 may be configured of a lamp such as CCFL or an organic light emitting element such as OLED.

The number of the light emitting elements 82 may be variable according to the size of the display panel (60, see FIG. 1), that is, inches of the display panel (60, see FIG. 1), for desired brightness and uniform distribution of lights.

The number of the light emitting elements 82 may be 2.5~3.5 times as much as the inches of the display panel (60, see FIG. 1).

If the number of the light emitting elements 82 is less than 2.5 times or more than 3.5 times as much as the inches of the display panel (60, see FIG. 1), it is difficult to provide lights having proper brightness and to distribute them uniformly.

For example, in case of a 47-inch display panel (60, see FIG. 1), 118 to 164 light emitting elements 82 may be installed. According to this embodiment, the display panel (60, see FIG. 1) is 47 inch-sized and 138 light emitting elements 82 are installed.

The supporting parts 10d configured to support the reflective sheet (20, see FIG. 1), the light guide plate (30, see FIG. 1) and the optical sheet (40, see FIG. 1) may be arranged right next to the edge wall 10c.

Figure 10:
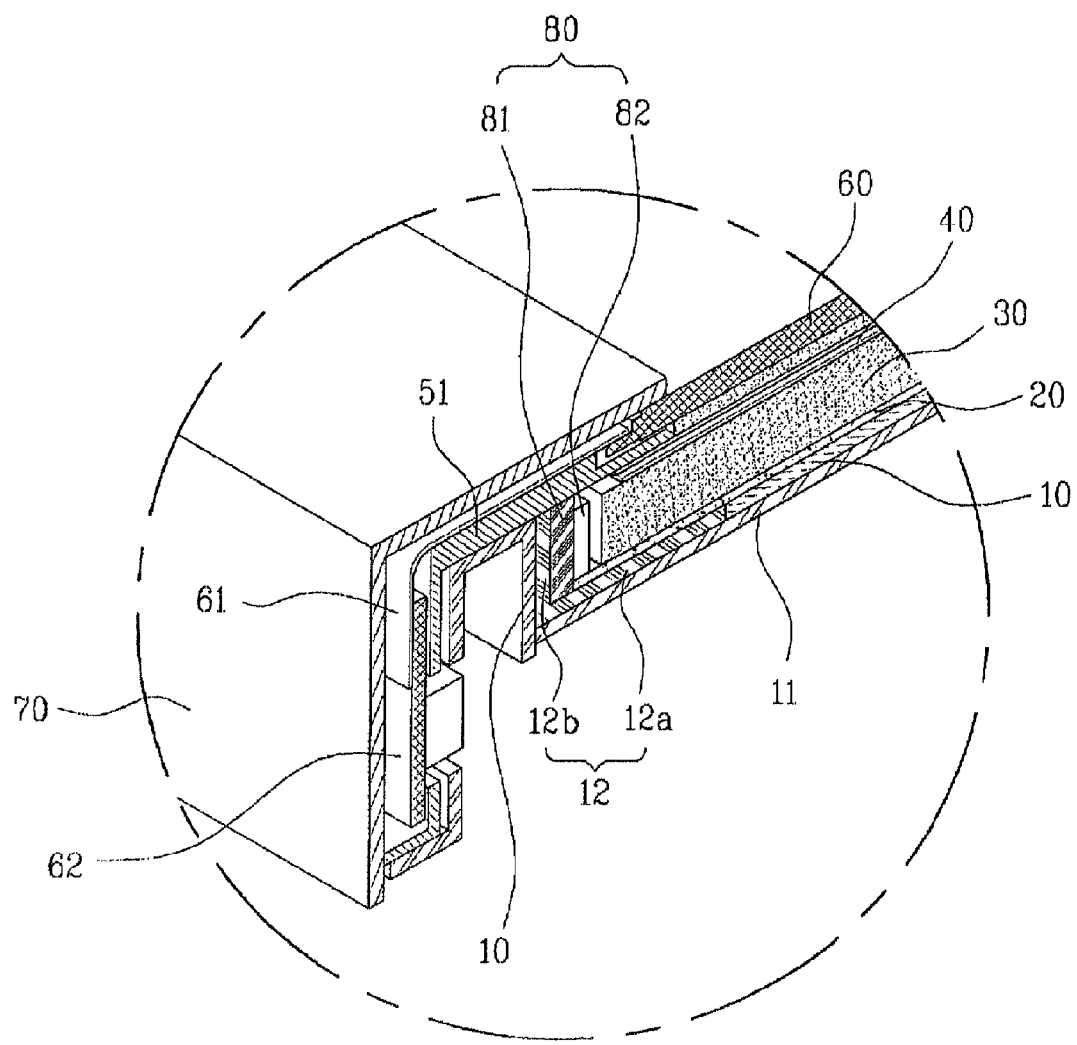
FIG. 10 is a side sectional view of a cut-away I-I' of the display device shown in FIG. 1.

As shown in FIG. 10, a partial section of the backlight unit and the display device according to this embodiment will be described as follows.

The first heat sinks 11 are arranged in the outside surface of the bottom cover 10.

The second heat sink 12 is arranged in the recess (100, see FIG. 2 or 3) provided in the bottom cover 10.

The second heat sinks 12 are formed approximately in an 'L' shape and the first heat radiating parts 12a of the second heat sinks 12 are in surface-contact with predetermined areas of the first heat sinks 11.

The second heat radiating part 12b is integrally formed with the first heat radiating part 12a, perpendicular to the first heat radiating part 12a or with an angle close to a perpendicular angle with respect to the first heat radiating part 12a. The light emitting module 80 is arranged in the second heat radiating part 12b. The module substrate 81 is arranged in the second heat radiating part 12b and the light emitting elements 82 are arranged on the module substrate 81.

As a result, when lights are emitted from the light emitting elements 82 after the power is applied to the module substrate 81, heat is generated secondarily and such heat is conducted to the second heat sinks 12. After that, the heat is moved to the first heat sinks 11 in contact with the second heat sinks 12, to be radiated outside.

The reflective sheet 20 is arranged on the entire surface of the bottom cover 10 and a front surface of the first heat radiating part 12a of the second heat sink 12 and the light guide plate 30 is arranged on a front surface of the reflective sheet 20.

An end portion of the light guide plate 30 is adjacent to the light emitting elements 82 such that the lights emitted from the light emitting elements 82 may be guided into the light guide plate 30.

The lights transmitted into the light guide plate 30 are moved forwardly through reflection, full-reflection and refraction.

Here, lights emitted rearward are reflected by the reflective sheet 20 to be re-transmitted into the light guide plate 30.

The optical sheet 40 is provided on the front surface of the light guide plate 30 to generate an optical phenomenon of the light and the display panel 60 is arranged in front of the optical sheet 40.

The flexible printed circuit board 61 is connected to an end of the display panel 60 and it is extended to a lower area of the backlight unit, passing the first fixing member 51. The flexible printed circuit board 61 is arranged in the bottom cover 10, connected with the printed circuit board 62.

The top cover 70 surrounds top, bottom, right and left edges of the display panel 60 and it surrounds top, bottom, right and left edges of the backlight unit including the printed circuit board 62, the flexible printed circuit board 61 and the bottom cover 10, such that it is employed to connect the backlight unit and the display panel 60 with each other.

Figure 11:
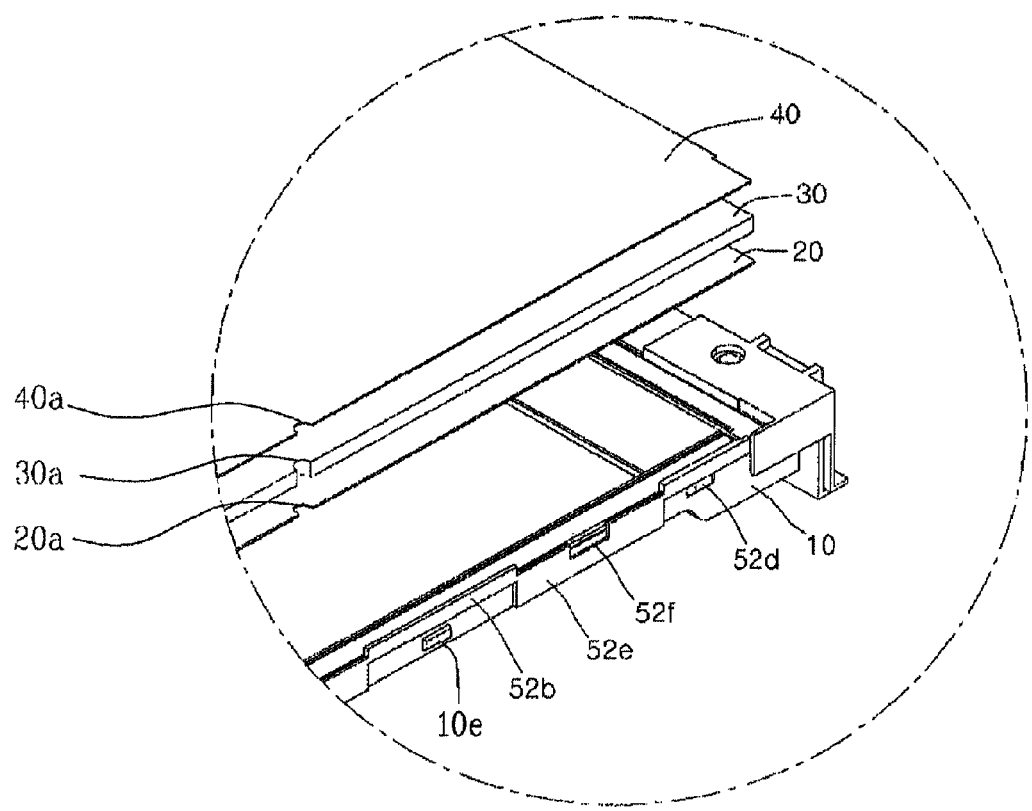
FIG. 11 is a perspective view illustrating the bottom cover, an optical sheet and a light guide plate, which are arranged in the backlight unit of the display device according to this embodiment.

As shown in FIG. 11, the reflective sheet 20, the light guide plate 30 and the optical sheet 40 are arranged between the second and third supporting members 52 and 53 (see FIG. 4) arranged in the bottom cover 10 and the side surface of the bottom cover 10.

Recesses 20a, 30a and 40a are provided in side surface edges of the reflective sheet 20, the light guide plate 30 and the optical sheet 40, respectively, to supportingly insert the supporting parts (10d, see FIG. 9) therein.

Figure 12:
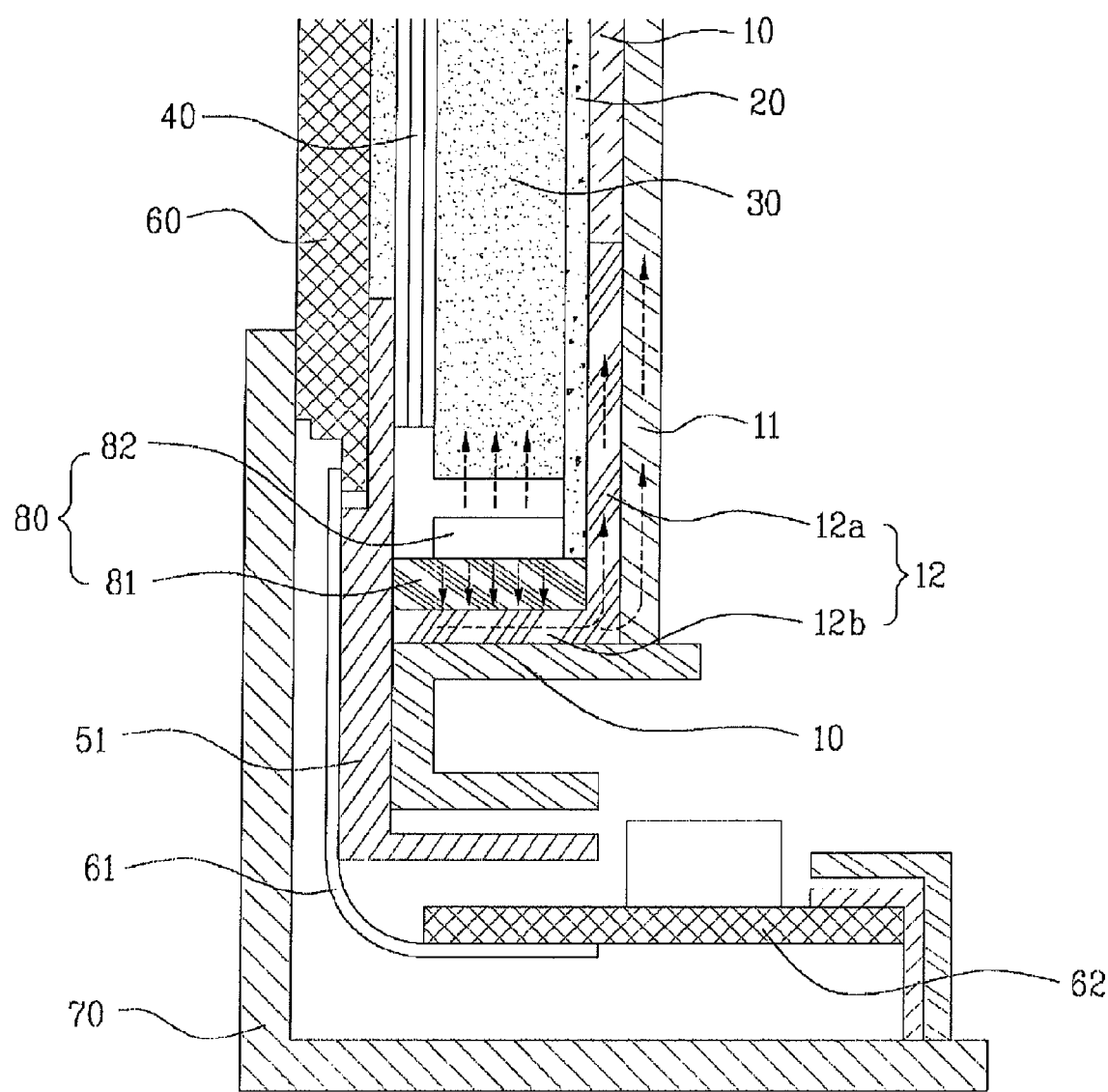
FIG. 12 is a side sectional view illustrating heat transmitting state in the display device according to this embodiment.

As shown in FIG. 12, movement of lights and heat performed by the light emitting module 80 will be described as follows.

Once the display device according to this embodiment is on, an electric current is applied to the light emitting module 80 and light emitting operation of the light emitting element 82 is performed. Because of that, lights are emitted outside the light emitting module 80.

The light guide plate 30 receives lights from the light emitting module 80, to be employed as surface-light source. The light guided by the light guide plate 30 passes the optical sheet 40 to have an optical phenomenon such as refraction.

Such process improves light efficiency.

In the meanwhile, the lights emitted toward the reflective sheet 20 from the light guide plate 30 are re-incident toward the light guide plate 30 by the reflection of the reflective sheet 20.

After that, the lights emitted from the optical sheet 40 are incident on the display panel 60 and the display panel 60 displays images of the lights, to be visible outside the display device.

Here, while the light emitting elements 82 performing light emission, heat is moved to the module substrate 81.

The heat transmitted to the module substrate 81 is moved to the second heat sink 12 and the heat of the second heat sink 12 is re-moved to the first heat sink 11.

The first heat sinks 11 heat-exchanges with external air and this heat exchanging radiates the heat remaining in the first heat sinks 11 to external air.

The first heat sinks 11 are arranged in the outer surface of the bottom cover 11 composing the backlight unit, not the inner surface thereof. Because of that, a contact area with external air of the backlight unit may be improved remarkably and relatively fast and efficient heat radiation may be performed advantageously.

According to the embodiment, the second heat sink 12 may include a first heat sink 12a contacting with a side surface of the module substrate 81 and upper surfaces of the first heat sinks, and a second heat radiating part 12b contacting with a lower surface of the module substrate 81.

Here, the side surface of the module substrate 81 and the first heat radiating part 12a may be adhered by a first adhesive material (not shown). The lower surface of the module substrate 81 and the second heat radiating part 12b may be adhered by a second adhesive material (not shown).

The first heat radiating part 12a of the second heat sink 12 may be arranged in parallel to the top surface of the first heat sink 11. The second heat radiating part 12b of the second heat sink 12 may be arranged perpendicular to the top surface of the first heat sink 11.

Also, the reflective sheet 20 may be arranged on the upper surface of the first heat radiating part 12a and the first heat sinks 11 may be arranged on the lower surface of the first heat radiating part 12a.

The first heat radiating part 12a has a first end and a second end opposed to each other. The first end of the first heat radiating part 12a contacts with an end of the bottom cover 10 and the second end of the first heat radiating part 12a may contact with an end of the second heat radiating part 12b.

In other words, the first heat sink 11 is arranged to an outside of the bottom cover 10, and the second heat sink 12 is arranged in the bottom cover 10.

Here, an upper surface of the first heat sink 11 is contacted with a lower surface of the bottom cover 10 and a lower surface of the first heat radiating part 12a of the second heat sink 12, simultaneously.

In this embodiment, a first heat sink is arranged in one side of the bottom cover, and a second heat sink is arranged in the other side of the bottom cover.

Here, the second heat sink is located between the light emitting module and the first heat sink.

Also, a recess is provided in the lower portion of the bottom cover so that the first heat radiating part of the second heat sink is coupled to the first heat sink located in one side of the bottom cover.

According to this embodiment, the heat sink is arranged to the external rear area of the backlight unit, not the internal area. Because of that, the heat of the light emitting module transmitted to the first heat sink may be radiated outside the backlight unit.

That is, the conventional heat sink is installed inside the backlight unit and it heat-exchanges with external air of the backlight unit. Because of that, it is limited to radiate the heat of the light emitting module outside. However, according to this embodiment, the heat is transmitted to the heat sink and it is transmitted to air outside the backlight unit. Because of that, heat radiation may be improved remarkably, compared with the related art.

As a result, difference between the temperature of the light emitting module and the temperature of the heat sink may be enlarged and a thermal gradient stage is intensified. More heat of the light emitting module may be transmitted to the heat sink more quickly to maintain heat parallel.

Because of that, the heat may be removed from the light emitting module more smoothly in comparison to the related art and usage life of the light emitting module may be lengthened advantageously.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A backlight unit comprising:
   a bottom cover;
   a light emitting module arranged in the bottom cover;
   at least one first heat sink arranged in one side of the bottom cover; and
   a second heat sink arranged in the other side of the bottom cover, the second heat sink located between the light emitting module and the first heat sink,
   wherein the second heat sink comprises:
     a first heat radiating part provided to contact with the first heat sink; and
     a second heat radiating part provided to contact the light emitting module.

2. The backlight unit of claim 1, wherein the light emitting module is arranged in a side portion of the bottom cover;
   the second heat radiating part of the second heat sink is arranged in a lower portion of the light emitting module; and
   the first heat radiating part of the second heat sink is bent from the second heat radiating part, to surface-contact with the first heat sink.

3. The backlight unit of claim 1, further comprising:
a recess provided in the lower portion of the bottom cover so that the first heat radiating part of the second heat sink is coupled to the first heat sink located in one side of the bottom cover.

4. The backlight unit of claim 3, wherein the recess is arranged, corresponding to the second heat sink.

5. The backlight unit of claim 3, wherein the width of the recess is identical to the width of the second heat sink.

6. The backlight unit of claim 3, wherein the first heat sink is arranged from a rear surface of the bottom cover in a predetermined direction; and
an end of the first heat sink is extended to surface-contact with the first heat radiating part of the second heat sink via an end of a rear surface of the bottom cover.

7. The backlight unit of claim 1, wherein the at least one first heat sink comprises a plurality of first heat sinks, and
wherein the plurality of the first heat sinks are arranged in a rear surface of the bottom cover, spaced apart a predetermined distance from each other.

8. The backlight unit of claim 1, wherein the first heat radiating part of the second heat sink is arranged in parallel to an upper surface of the first heat sink, and the second heat radiating part of the second heat sink is arranged perpendicular to the upper surface of the first heat sink.

9. A backlight unit comprising:
a bottom cover;
a light emitting module provided in a predetermined area of the bottom cover, the light emitting module comprising a module substrate and a light emitting element formed on an upper surface of the module substrate;
a first heat sink arranged in one side of the bottom cover;
a second heat sink arranged in the other side of the bottom cover, the second heat sink comprising a first heat radiating part contacting a side surface of the module substrate and an upper surface of the first heat sink and a second heat radiating part contacting a lower surface of the module substrate.

10. The backlight unit of claim 9, wherein the side surface of the module substrate and the first heat radiating part are adhered by a first adhesive material, and the lower surface of the module substrate and the second heat radiating part are adhered by a second adhesive material.

11. The backlight unit of claim 9, wherein the first heat radiating part of the second heat sink is arranged in parallel to an upper surface of the first heat sink and the second heat radiating part of the second heat sink is arranged perpendicular to the upper surface of the first heat sink.

12. The backlight unit of claim 9, wherein a reflective sheet is arranged on an upper surface of the first heat sink and the first heat sink is arranged on a lower surface of the first heat radiating part.

13. The backlight unit of claim 9, wherein the first heat radiating part comprises a first end and a second end opposed to each other, and the first end of the first heat radiating part contacts with an end of the bottom cover and the second end of the first heat radiating part contacts with an end of the second heat radiating part.

14. A display device having a backlight unit, the display device comprising:
a bottom cover;
a light emitting module arranged in a predetermined area of the bottom cover;
a first heat sink arranged in one side of the bottom cover;
a second heat sink arranged in the other side of the bottom cover, the second heat sink located between the light emitting module and the first heat sink;
a light guide plate arranged in a light emitting direction of the light emitting module;
an optical sheet arranged on the light guide plate; and
a display panel arranged on the optical sheet,
wherein the second heat sink comprises:
a first heat radiating part provided to contact with the first heat sink; and
a second heat radiating part provided in a lower portion of the light emitting module to contact with the light emitting module.

15. The display device of claim 14, wherein the light emitting module is arranged in a predetermined area of the bottom cover in a line, and
wherein the first heat radiating part and the second heat radiating part are integrally formed with each other.

16. The display device of claim 15, wherein the first heat radiating part of the second heat sink is arranged in parallel to an upper surface of the first heat sink and the second heat radiating part of the second heat sink is arranged perpendicular to the upper surface of the first heat sink.

17. The display device of claim 15, wherein a reflective sheet is arranged on an upper surface of the first heat sink and the first heat sink is arranged on a lower surface of the first heat radiating part.

18. The display device of claim 15, wherein the first heat radiating part comprises a first end and a second end opposed to each other, and the first end of the first heat radiating part contacts with an end of the bottom cover and the second end of the first heat radiating part contacts with an end of the second heat radiating part.

19. The display device of claim 14, further comprising:
a recess provided in the lower portion of the bottom cover, with the first heat radiating part of the second heat sink insertedly arranged thereto in a state of maintaining the contact with the first heat sink, to allow an inside in communication with an outside of the bottom cover.

20. The display device of claim 14, wherein the first heat sink is arranged from a rear surface of the bottom cover in a predetermined direction; and
an end of the first heat sink is extended to surface-contact with the first heat radiating part of the second heat sink via an end of a rear surface of the bottom cover.

* * * * *